United States Patent
Rautio

(10) Patent No.: US 10,322,376 B2
(45) Date of Patent: Jun. 18, 2019

(54) MEMBRANE LAMINATE

(71) Applicant: EMD Millipore Corporation, Burlington, MA (US)

(72) Inventor: Kevin Rautio, Manchester by the Sea, MA (US)

(73) Assignee: EMD Millipore Corporation, Burlington, MA (US)

( * ) Notice: Subject to any disclaimer, the term of this patent is extended or adjusted under 35 U.S.C. 154(b) by 87 days.

(21) Appl. No.: 15/351,538

(22) Filed: Nov. 15, 2016

(65) Prior Publication Data

US 2017/0056830 A1 Mar. 2, 2017

Related U.S. Application Data

(62) Division of application No. 12/451,467, filed as application No. PCT/US2008/006382 on May 15, 2008.
(Continued)

(51) Int. Cl.
*B01D 61/14* (2006.01)
*B01D 63/08* (2006.01)
(Continued)

(52) U.S. Cl.
CPC ......... *B01D 65/003* (2013.01); *B01D 61/145* (2013.01); *B01D 63/081* (2013.01); *B01D 63/084* (2013.01); *B01D 63/087* (2013.01); *B01D 69/10* (2013.01); *B01D 69/12* (2013.01); *B01D 71/34* (2013.01); *B01D 71/68* (2013.01); *B29C 65/18* (2013.01); *B29C 66/0042* (2013.01); *B29C 66/1122* (2013.01); *B29C 66/24221* (2013.01); *B29C 66/24244* (2013.01); *B29C 66/30326* (2013.01); *B29C 66/54* (2013.01); *B29C 66/71* (2013.01); *B29C 66/712* (2013.01); *B29C 66/727* (2013.01); *B29C 66/919* (2013.01); *B29C 66/91421* (2013.01); *B29C 66/91431* (2013.01); *B29C 66/91933* (2013.01); *B01D 2313/16* (2013.01); *B01D 2323/08* (2013.01); *B29C 66/8122* (2013.01); *B29C 66/929* (2013.01);
(Continued)

(58) Field of Classification Search
None
See application file for complete search history.

(56) References Cited

U.S. PATENT DOCUMENTS 3,954,625 A  5/1976  Michalski
4,824,568 A  4/1989  Allegrezza et al.
(Continued)

FOREIGN PATENT DOCUMENTS

CN  1338970 A   3/2002
CN  101730576 A  6/2010
(Continued)

OTHER PUBLICATIONS

International Search Report dated Aug. 7, 2008 in corresponding PCT application No. PCT/US2008/006382.
(Continued)

*Primary Examiner* — Krishnan S Menon
(74) *Attorney, Agent, or Firm* — Nields, Lemack & Frame, LLC

(57) ABSTRACT

A laminate is provided comprising at least one polysulfone and/or polyethersulfone porous membrane heat bonded to a polyvinylidene fluoride substrate.

6 Claims, 2 Drawing Sheets

Related U.S. Application Data

(60) Provisional application No. 60/930,585, filed on May 17, 2007.

(51) Int. Cl.

| | | |
|---|---|---|
| *B01D 65/00* | (2006.01) | |
| *B01D 69/10* | (2006.01) | |
| *B01D 69/12* | (2006.01) | |
| *B01D 71/34* | (2006.01) | |
| *B01D 71/68* | (2006.01) | |
| *B29C 65/00* | (2006.01) | |
| *B29C 65/18* | (2006.01) | |
| *B29K 27/00* | (2006.01) | |
| *B29K 81/00* | (2006.01) | |
| *B29L 22/00* | (2006.01) | |
| *B29L 31/14* | (2006.01) | |
| *B29K 105/00* | (2006.01) | |
| *B29K 105/04* | (2006.01) | |

(52) U.S. Cl.
CPC ...... *B29C 66/9492* (2013.01); *B29K 2027/16* (2013.01); *B29K 2081/06* (2013.01); *B29K 2105/0085* (2013.01); *B29K 2105/0088* (2013.01); *B29K 2105/04* (2013.01); *B29L 2022/00* (2013.01); *B29L 2031/14* (2013.01); *Y10T 156/10* (2015.01)

(56) References Cited

U.S. PATENT DOCUMENTS

| | | | |
|---|---|---|---|
| 4,940,562 | A | 7/1990 | Watanabe et al. |
| 7,208,200 | B2 | 4/2007 | Kools |
| 2005/0279695 | A1 | 12/2005 | Straeffer et al. |
| 2010/0181248 | A1 | 7/2010 | Rautio |

FOREIGN PATENT DOCUMENTS

| | | |
|---|---|---|
| EP | 0245863 B1 | 11/1987 |
| EP | 1609517 B1 | 12/2005 |
| WO | 2006/044712 A1 | 4/2006 |

OTHER PUBLICATIONS

International Preliminary Report on Patentability dated Nov. 17, 2009 in corresponding PCT application No. PCT/US2008/006382.
Office action dated May 25, 2012 in co-pending U.S. Appl. No. 12/451,467.
Office action dated Jul. 11, 2012 in co-pending U.S. Appl. No. 12/451,467.
Final rejection dated Dec. 27, 2012 in co-pending U.S. Appl. No. 12/451,467.
Office action dated May 19, 2014 in co-pending U.S. Appl. No. 12/451,467.
Final rejection dated Aug. 28, 2014 in co-pending U.S. Appl. No. 12/451,467.
Office action dated Mar. 3, 2015 in co-pending U.S. Appl. No. 12/451,467.
Final rejection dated Aug. 7, 2015 in co-pending U.S. Appl. No. 12/451,467.
Appeal Decision dated Dec. 29, 2017 in co-pending U.S. Appl. No. 12/451,467.
Office action dated Mar. 9, 2018 in co-pending U.S. Appl. No. 12/451,467.
Office communication dated Mar. 15, 2018 in co-pending U.S. Appl. No. 12/451,467.
Office action dated Oct. 17, 2018 in co-pending U.S. Appl. No. 12/451,467.
Notice of allowance dated Feb. 13, 2019 in co-pending U.S. Appl. No. 12/451,467.

MEMBRANE LAMINATE

RELATED APPLICATIONS

This application is a divisional of U.S. patent application Ser. No. 12/451,467 filed Mar. 4, 2010, which claims the benefit of priority of U.S. Provisional Patent Application No. 60/930,585, filed on May 17, 2007, the entire contents of each of which are incorporated by reference herein. U.S. patent application Ser. No. 12/451,461 is a 371 of PCT/US2008/006382 filed May 15, 2008.

FIELD OF THE INVENTION

This invention relates to a membrane structure comprising a polysulfone or polyethersulfone membrane, heat bonded to a PVDF (polyvinylidene fluoride) substrate.

BACKGROUND OF THE INVENTION

At the present time, it is desirable to provide filtration apparatus for removing virus from biological fluids which are presterilized at the site of manufacturing the filtration apparatus and sanitized at the site of using the filtration apparatus. Generally, sterilization at the manufacturing site is effected with gamma radiation and sanitization is effected with caustic at the site of use. Caustic sanitization is effected first with a caustic aqueous solution (typically 0.1 normal sodium hydroxide), then with sterile water followed by sterile buffer. Accordingly, it is necessary that the filtration apparatus be resistant to degradation due to both gamma radiation and caustic.

The filtration apparatus utilizes elements comprising a support plate to which is bonded a filtration membrane generally comprising a polysulfone (PS) membrane or a polyethersulfone (PES) membrane since high performance ultrafiltration (UF) can be effected therewith.

At the present time, it is known that PS or PES membranes can be heat bonded to an acrylic substrate. Since acrylic is not caustic resistant, its use in processes that requires caustic sterilization is undesirable.

PS or PES membrane can be easily thermally bonded to a polysulfone substrate (plate) because of the similarity of the materials. However, it is difficult to bond the plates together. A process typically used to bond plates together is called contact welding. The process involves putting two plastic plates in contact with a heater until the plastic begins to melt. The plates are then removed from the heater, the heater is slid out of the way and the plates are pressed together. This process requires the plastic material to remain molten until the two plates are pressed together so that, when the material cools, the two plates are completely welded. It is difficult to weld a polysulfone or polyethersulfone plate to a plate of the same or similar material using this process. It has been found that melted PS or PES quickly forms a skin when the heating element is removed therefrom which renders formation of a good plate to plate bond difficult.

Other methods of welding PS or PES plates together have been attempted and proven to be difficult or produce some negative effect on the finished product. Some of these methods include laser welding, radio frequency (RF) welding, vibration welding, ultrasonic welding and solvent welding. Laser and RF welding do not produce a sufficiently strong bond. Vibration and ultrasonic welding result in a generation of PS or PES particles that is undesirable. Solvent welding with a solvent like methylene chloride is difficult because the membrane is made of a similar material and can be changed or dissolved by the solvent.

Accordingly, it would be desirable to provide elements of a filtration cartridge which include a membrane heat bonded to a substrate that can be contact welded and have none of the negative effects discussed above. In addition, it would be desirable to provide such elements which are also resistant to degradation by exposure to either gamma radiation or caustic.

SUMMARY OF THE INVENTION

Figure 1:
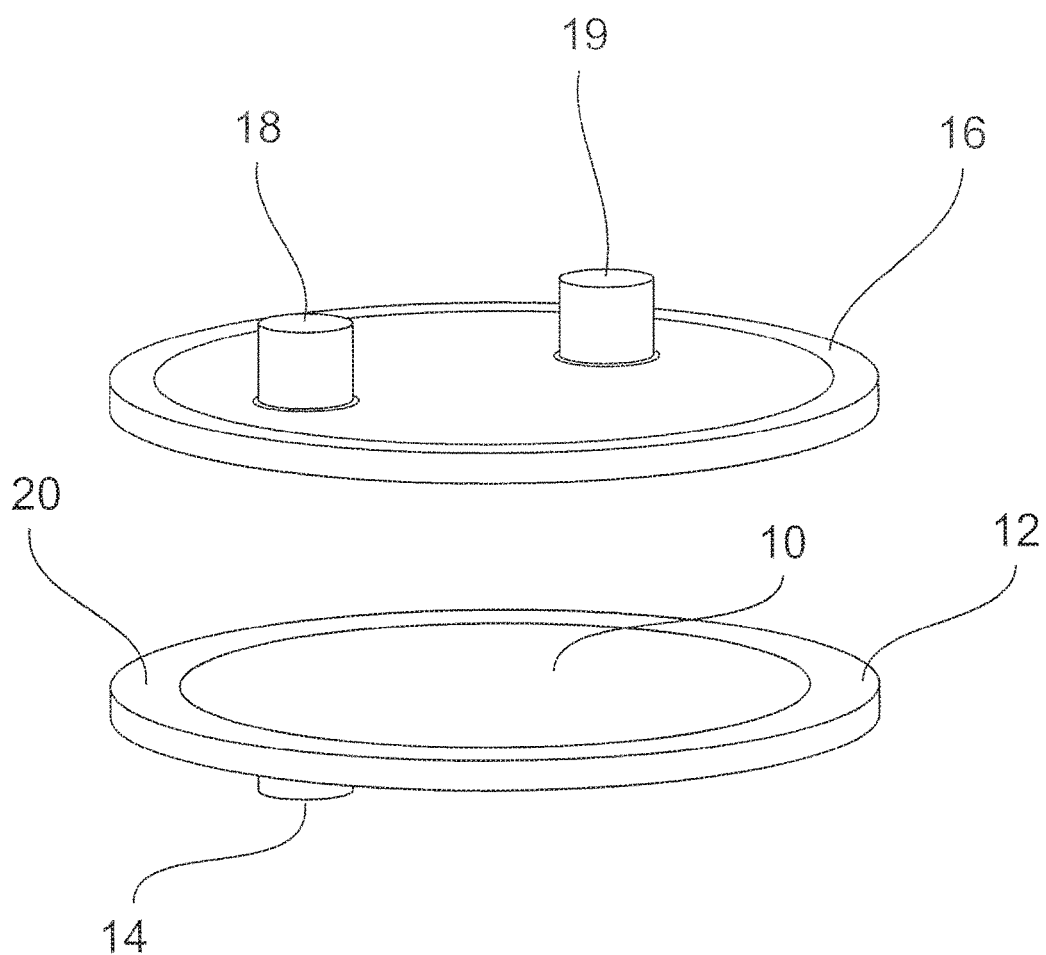
FIG. 1 is an exploded view of a filtration cartridge produced by the present invention.

The present invention provides filtration cartridge elements having a PS or PES membrane heat bonded to a polyvinylidene fluoride (PVDF) substrate. Two or more PVDF substrates are then easily and simply bonded together. Heat bonding is effected by applying a heating element under pressure to a membrane comprising PS or PES or copolymers thereof or blends thereof which, in turn, is in contact with the PVDF substrate in order to partially melt the PVDF substrate to a degree that the molten PVDF infiltrates the PS or PES membrane pores. The heating element is removed and the molten PVDF is cooled to solidify it. The resultant bond of membrane to substrate is sufficiently strong that attempts to remove the membrane from the substrate results in membrane residue remaining bonded to the substrate. Two or more PVDF substrates can then be heat bonded to each other.

DESCRIPTION OF SPECIFIC EMBODIMENTS

In accordance with the present invention, the membrane can have any configuration such as symmetric or asymmetric (skinned or unskinned), or the like. In addition, the membrane can have any porosity such as a reverse osmosis (RO) membrane, ultrafiltration (UF) membrane, microfiltration (MF) membrane, or the like. The PS or PES membranes generally have a melting point between about 428° F. (140° C.) and about 446° F. (230° C.). Such membranes are well known and made by many manufacturers including Millipore Corporation of Billerica, Mass. under tradenames such as Millipore Express® membranes. A preferred membrane is a unitary membrane made by a co-cast process in which the composite membrane is formed from two or more polymeric solutions which are cast upon each other essentially simultaneously. This allows one to create unique membranes such as having two zones of asymmetry or symmetry, a zone of asymmetry with a zone of symmetry and the like. Pore sizes and thickness in each of the zones can also be varied. U.S. Pat. No. 7,208,200 shows one process for making such membranes.

The PVDF substrate to which the PS and/or PES membrane is bonded can be designed to include internal porting for feed, permeate and/or retentate as well as fluid pathways to effect desired fluid flow. PVDF generally has a melting point between about 284° F. (140° C.) and about 356° F. (180° C.). In order to effect bonding of one or more PS and/or PES membranes to a PVDF substrate, a heating element is provided. It is preferred that the portion of the heating element that contacts the membrane is provided with an anti-stick surface such as polytetrafluoroethylene (PTFE) so that the membrane to substrate bond is not adversely affected. The heating element is heated to a temperature of between about 490° F. (254° C.) and about 530° F. (277° C.) and it is applied to the membrane at the desired bond area which overlaps with at least a portion of the PVDF substrate, under pressure to assure intimate contact between the membrane and the substrate. Heating under pressure is effected for a time period sufficient to melt the PVDF at the desired bond area and to permit infiltration of the molten PVDF into the membrane pores. The heating element is then removed from contact with the membrane and the resulting laminate is allowed to cool to permit the molten PVDF to solidify.

A second PVDF substrate which may or may not contain a membrane as desired, is then brought near the first PVDF substrate to which PS or PES membrane has already been sealed as described above. The second substrate may contain one or more ports for feed, permeate and/or retentate, gas venting or the like as desired.

The second substrate is heated with the heating element and then pressed against the surface of the first PVDF substrate containing the membrane to seal the first and second PVDF substrates together.

The following example illustrates the present invention and is not intended to limit the same.

Example 1

As shown in FIG. 1, a polyethersulfone UF membrane 10 was bonded to the circular PVDF support plate 12 having a fluid outlet 14. The temperature of the heating element used was 510° F. (265° C.) to 540° F. (282° C.). The sealing time was 4 to 10 seconds at a pressure of 20 to 30 psig. A circular PVDF top plate 16 having a fluid inlet 18 then was heat bonded to the PVDF support plate 12 about the periphery 20 to form a filtration cartridge having a PES membrane 10, a fluid inlet 18 and a fluid outlet 14 where all fluid feed is required to pass through the membrane 10 prior to passing through the outlet 14. Preferably, the top plate 16 is bonded to the support plate 12 outside of the area to which membrane 10 is bonded to the support plate 12.

The device according to the Example provides an integrally sealed membrane to the support plate and a liquid tight integrally sealed top plate to the bottom plate. The manufacture is simple, quick and easy and avoids the problems of the past while providing a device that is both gamma radiation and caustic stable.

Optionally, as shown another port 19 may also be used on one (as shown) or both plates 12, 16. This may be used for gas venting with an appropriate gas filter attached to it (not shown) such as a MILLEX® gas vent filter available from Millipore Corporation of Billerica, Mass. Alternatively, it can be connected to a conduit (not shown) for the retentate that can then be returned to the supply for recirculation as occurs in tangential flow filtration.

Figure 2:
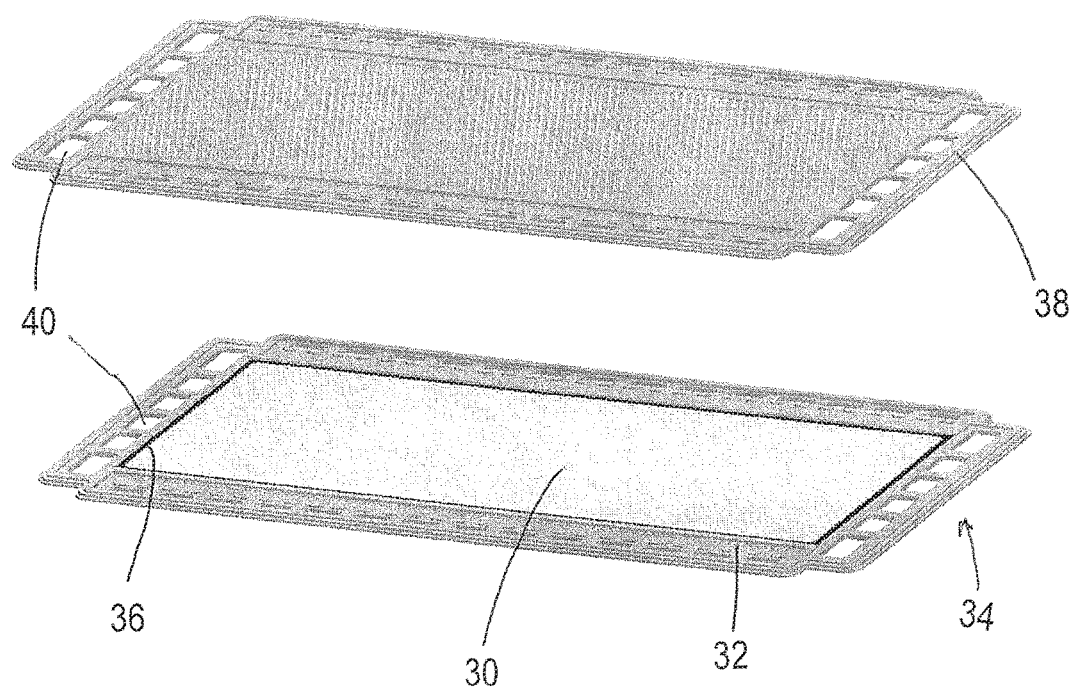
FIG. 2 is an exploded view of a filtration cartridge produced by the present invention.

While FIG. 1 shows the device in a round format, other formats may be used as well. For example, FIG. 2 shows a typical plate and frame design often used in cassette style filter devices. In FIG. 2, the PS or PES membrane 30 is bonded to a surface 32 of a first cassette frame 34 as indicated by sealing line 36. A second cassette frame 38 is then bonded to the first cassette frame 34 outside of the area 36 to which the membrane is attached to the first cassette frame 34. Various ports 40 are shown in the cassette frames 34 and 38. Two or more frames may be used. Multiple cassettes can be stacked upon each other to form a suitably sized device. The cassettes may have a sealed outer surface, at least on the outermost cassette on each end or they may have separate additional solid end plates (not shown) also made of PVDF bonded in a similar fashion to their outer surfaces as are well known in the art.

What is claimed:

1. A process of forming a filtration device comprising providing a at least one porous ultrafiltration membrane selected from the group consisting of polysulfone, polyethersulfone, blends thereof and copolymers thereof; providing a first and a second support plate wherein the first and second support plates are formed of PVDF, the support plates having a first surface facing each other and a second surface opposite the first surface of each plate and the plates having at least one port formed from the first surface to the second surface of each plate respectively; heat bonding the at least one ultrafiltration membrane to a first surface of the first support plate such that the PVDF melts and the molten PVDF infiltrates into pores in the membrane; and heat bonding the first surface of the first plate to the first surface of the second plate in an area outside of the area of the first surface of the first plate to which the membrane has been bonded.

2. The process of claim 1 wherein the first surface of the first plate is bonded to the first surface of the second plate about the periphery of each.

3. The process of claim 1 further comprising providing a heating element heated to a temperature of from about 490° F. (254° C.) to about 530° F. (277° C.) and applying the heating element to the membrane at a desired bond area which overlaps with at least a portion of the first surface of the first support plate and removing the heating element and allowing the bond to cool.

4. The process of claim 1 further comprising providing a heating element heated to a temperature of from about 490° F. (254° C.) to about 530° F. (277° C.); applying the heating element to the membrane at a desired bond area which overlaps with at least a portion of the first surface of the first support plate with sufficient pressure to assure intimate contact between the membrane and the first surface of the support plate and removing the heating element and allowing the bond to cool.

5. The process of claim 1 further comprising providing a heating element heated to a temperature of from about 284° F. (140° C.) and about 530° F. (277° C.) and applying the heating element to the first surface of the second support plate at a desired bond area; removing the heating element and contacting the first surface of the second support plate to the first surface of the first plate.

6. The process of claim 1 further comprising providing a heating element heated to a temperature of from about 284° F. (140° C.) and about 530° F. (277° C.) and applying the heating element to the first surface of the second support plate at a desired bond area; removing the heating element and contacting the first surface of the second support plate to the first surface of the first plate wherein the first surface of the first plate is bonded to the first surface of the second plate about the periphery of each.

* * * * *